United States Patent
Wei

(10) Patent No.: US 7,724,190 B2
(45) Date of Patent: May 25, 2010

(54) SIGNALING METHOD AND APPARATUS USING RADIAL INTERPLEX

(75) Inventor: Jerome H. Wei, La Habra, CA (US)

(73) Assignee: The Boeing Company, Chicago, IL (US)

( * ) Notice: Subject to any disclaimer, the term of this patent is extended or adjusted under 35 U.S.C. 154(b) by 68 days.

(21) Appl. No.: 11/866,149

(22) Filed: Oct. 2, 2007

(65) Prior Publication Data

US 2009/0085739 A1    Apr. 2, 2009

(51) Int. Cl.
  *G01S 1/02*    (2006.01)
  *G01S 1/08*    (2006.01)
(52) U.S. Cl. .............. 342/386; 342/357.09; 342/357.13
(58) Field of Classification Search ............ 342/357.06, 342/357.09, 357.13, 385, 415, 386; 340/539.13; 375/324, 326, 340
See application file for complete search history.

(56) References Cited

U.S. PATENT DOCUMENTS

| 7,035,245 | B2 | 4/2006 | Orr et al. |
| 7,039,122 | B2 | 5/2006 | Dragonetti |
| 7,254,188 | B2 * | 8/2007 | Cannon et al. .............. 375/324 |
| 2005/0129147 | A1 * | 6/2005 | Cannon et al. .............. 375/324 |
| 2008/0133982 | A1 * | 6/2008 | Rawlins et al. .............. 714/699 |

* cited by examiner

*Primary Examiner*—Dao L Phan

(57) ABSTRACT

Embodiments of the disclosure provide methods, apparatus, and articles related to code combination for GPS III, and more particularly, to methods and apparatuses for enabling signal modulation that potentially may minimize power throw away for target code power ratios by shifting linear signal constellation points radially to a circle of equal amplitude, e.g., where the circumference represents e.g. the average RMS power of the original linear signals.

19 Claims, 7 Drawing Sheets

SIGNALING METHOD AND APPARATUS USING RADIAL INTERPLEX

GOVERNMENT SUPPORT

This disclosure was made with Government support under contract FA8807-04-C-0002 awarded by the United States Air Force. The Government has certain rights in this disclosure.

FIELD

Embodiments of the present disclosure relate generally to the field of data communication, and more particularly to global positioning system (GPS) navigation signal code transmission.

BACKGROUND

Advances in technology and new demands on the existing Global Positioning System (GPS) led to an effort to modernize the GPS system. In 2000, U.S. Congress authorized the effort, referred to as GPS III. One of the key changes was the addition of two new L1 codes, taking the total signal codes transmitted by each GPS satellite from 3 to 5 signal codes per channel.

One of the key parameters of GPS navigation is ranging information. This information is obtained from the pseudo-random codes transmitted from the GPS satellites. A key characteristic of the pseudo-random codes is that they are orthogonal to each other, to the same codes from a different space vehicle, and to different time shifts of themselves. The GPS receiver independently generates local replicas of the pseudo-random codes in parallel as it receives the pseudo-random codes from a transmitting GPS satellite. The GPS receiver compares the generated codes with the received codes. When the time offsets of the corresponding code streams are aligned, correlation of the GPS signal with other GPS signals from other GPS satellites may be determined. Based on the correlated GPS signals, a GPS receiver may triangulate its position on the surface of the earth.

At present, each GPS satellite transmits a signal made up of three signal codes, these three signal codes are linearly combined and interplexed. To interplex three code signals, two of the code signals are added and placed on one phase of a signal, with the third binary signal and an additional throw-away signal being combined and placed on the other phase. The throw-away signal added to the solitary signal is completely defined by the other three pre-existing signals and contains no message information. Its primary purpose is to shift the symbol points of the signal linear constellation along a vertical axis so the symbols points are relocated onto an equi-amplitude circle. The amount each symbol point is shifted along a vertical axis is the same.

For a signal made up of three GPS signal codes, interplex is a relatively efficient approach, and provides for good correlatable Power Percentage, with the actual percentage of the radio frequency (RF) signal correlatable dependent on the code power ratios of the signal.

With the introduction of GPSIII and the additional two signal GPS codes, however, the current system of combining GPS codes can not be utilized, as the current method does not support the combining of the two extra GPS codes.

SUMMARY

Illustrative embodiments describe a signaling method which may comprise receiving, by a computing device, a plurality of target code power ratios for a signaling system to transmit a plurality of codes via a combined signal combining a plurality of signals correspondingly having the codes. The computing device may further determine a radial constellation having plurality of symbol points substantially meeting the target code power ratios, the radial constellation of symbol points having a radially movement relationship with symbol points of an adjusted linear constellation derived from symbol points of a linear constellation corresponding to linearly combining the signals having the codes.

Additional or alternative embodiments describe a signaling system which may comprise one or more signal generators generating a plurality of signals having a plurality of codes. The signaling system may also include a storage having stored therein a data structure of a plurality of symbol points of a radial constellation substantially meeting a plurality of target code power ratio, the radial constellation of symbol points having a radially movement relationship with symbol points of an adjusted linear constellation derived from symbol points of a linear constellation corresponding to linearly combining the signals having the codes. In some embodiments, the signaling system may further comprise a signal combiner coupled to the one or more signal generators and the storage to combine the plurality of signals into a combined signal and a transmitter coupled to the signal combiner to transmit the combine signal.

Further or alternative embodiments describe an apparatus which may comprise a receiver to receive a combined signal combining a plurality of signals of a plurality of codes, the combined signal being transmitted using symbol points of a radial constellation, the radial constellation of symbol points having a radially movement relationship with symbol points of an adjusted linear constellation derived from symbol points of a linear constellation corresponding to linearly combining the signals having the codes. The apparatus may also include a storage having stored therein a data structure of the symbol points of the radial constellation and a signal recoverer coupled to the receiver and the storage to recover and output the signals having the codes.

Additional or alternative embodiments describe an article of manufacture which may comprise a computer readable medium having stored therein a plurality of programming instructions for programming an apparatus. The programming instructions may enable an apparatus to determine a radial constellation having plurality of symbol points substantially meeting a plurality of target code power ratios, the radial constellation of symbol points having a radially movement relationship with symbol points of an adjusted linear constellation derived from symbol points of a linear constellation corresponding to linearly combining the signals having the codes.

The features, functions, and advantages can be achieved independently in various embodiments of the present inventions or may be combined in yet other embodiments.

BRIEF DESCRIPTION OF THE DRAWINGS

Embodiments of the present disclosure will be readily understood by the following detailed description in conjunction with the accompanying drawings. Embodiments of the present disclosure are illustrated by way of example and not by way of limitation in the figures of the accompanying drawings.

DETAILED DESCRIPTION

Figure 1:
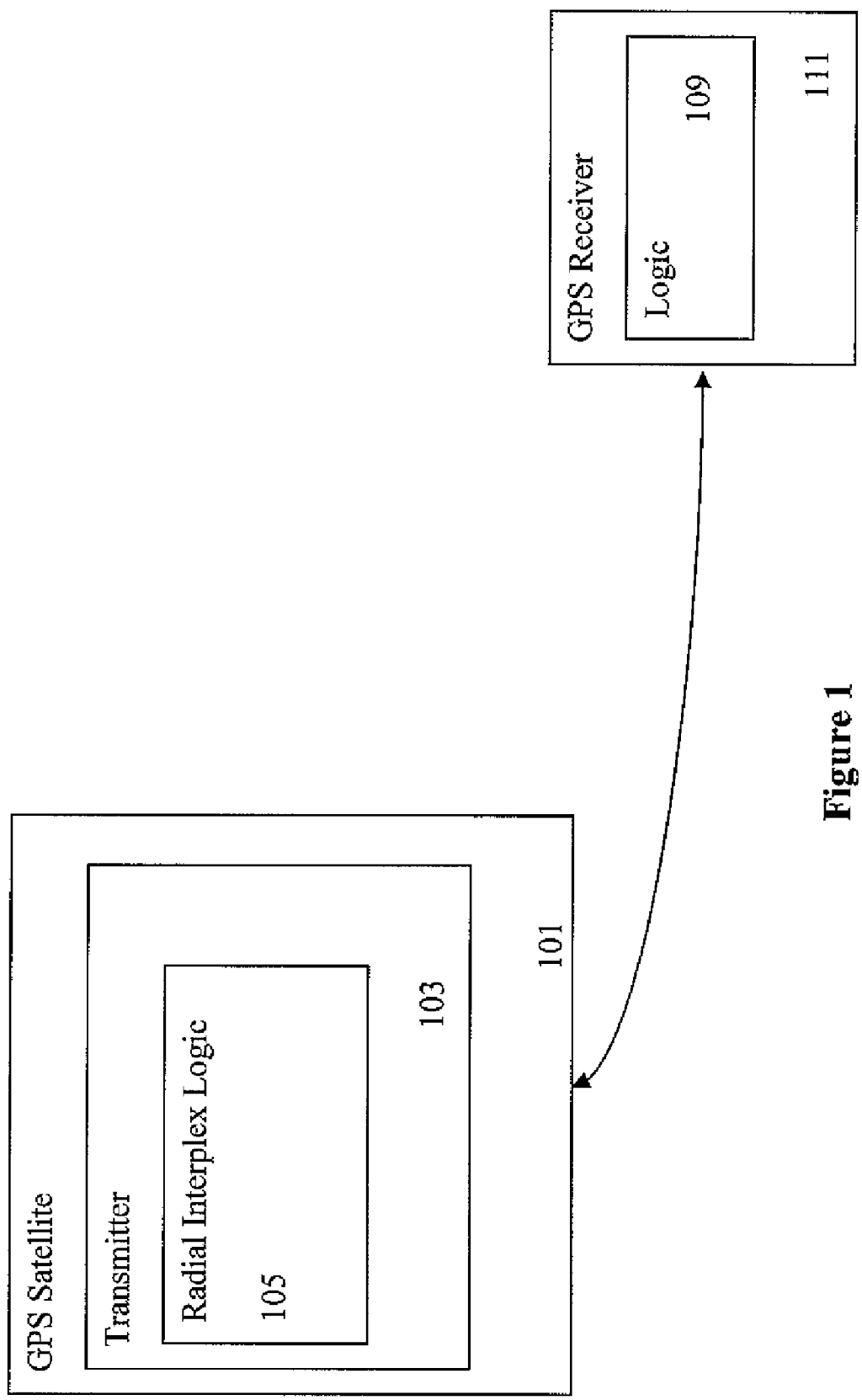
FIG. 1 depicts an embodiment of a Global Positioning System, specifically a GPS satellite transmitting a GPS signal to a GPS receiver, in accordance with various embodiments of the present disclosure.

Illustrative embodiments of the disclosure include, but are not limited to, methods, apparatuses and articles for enabling combined transmission of GPS signal codes, substantially meeting target code power ratios, and GPS signaling systems endowed with outputs/results of these methods/apparatuses.

For the purpose of the present application, metrics used for defining characteristics of a signal at the output of the transmitter, and representing performance with respect to the transmitter and the receiver include total correlated power, correlatable power percentage, and correlatable power efficiency.

The Total Correlated Power metric is a measure of usable code power that can be extracted by the receiver within a bandwidth, e.g., 24 MHz. Different code combining schemes incur different amounts of combining loss, and Total Correlated Power is used in combination with the Total RF Power measured with e.g., a broadband power meter.

Correlatable Power Percentage is a measure of the purity of the signal being transmitted. The higher this percentage, the more RF power that is being emitted from the transmitter is actually power usable to the receiver. The unusable power, in addition to providing no utility to the receiver, shows up as a noise term in the correlation process.

Correlatable Power Efficiency is defined as the Total Correlated Power of an RF signal divided by the DC power consumption at that particular operating point. This metric pertains to the transmitter design, in particular, the necessary amount of raw input power from the transmitter to produce a certain level of Total Correlated Power.

The term "linear interplex" as used herein, refers to methods of shifting the symbol points of a signal linear constellation along an axis so the symbols points are relocated onto an equi-amplitude circle.

The term "radial interplex", as used herein, refers to methods of radially shifting the symbol points of a signal linear constellation so the symbols points are relocated onto an equi-amplitude circle.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

FIG. 1 depicts an embodiment of a Global Positioning System, specifically a GPS satellite 101 transmitting a GPS signal of combined signal codes in a radial interplexed manner, through free space, to a GPS receiver 111, in accordance with various embodiments of the present disclosure. In some embodiments, the satellite transmitter 103 may transmit a constant or intermediate amplitudinal signal, if a distortion factor is equal to one or between one and zero, respectively for the supplied GPS signal codes effectively combining the signal codes in a manner that substantially meets a set of target code power ratios, using Radial Interplex logic 105. The Radial Interplex logic 105 includes a Lookup Table (LUT) having symbol points of a Radial Constellation to radial interplex and encode the combined signal codes in the amplitudinal signal. The transmitted signal is received by the GPS receiver 111, and using logic 109 within the receiver is able to recover the signal codes, correlate the signal with signals from other GPS transmitters to triangulate the GPS receiver's location on the surface of earth.

In various embodiments, the Radial Constellation is designed to enable the amplitudinal signal to be transmitted with the highest correlatable power efficiency with a high percentage of correlatable power percentage, with the actual percentage of the RF signal correlatable for the code power ratios supplied. This may allow for more average power to be present at the output of the amplifier of the Satellite Transmitter 103

In various embodiments, the satellite transmitter 103 transmits an amplitudinal signal for five signal codes effectively combining the five signal codes in a manner that substantially meets a set of target code power ratios, using Radial Interplex logic 105. The Radial Interplex logic 105 includes a Lookup Table (LUT) having $2^5$ (32) symbol points of a Radial Constellation to encode the combined five signal codes in the amplitudinal signal.

In various embodiments, the Radial Constellation is determined external to the GPS satellite, in view of a set of given target code power ratios, and provided to the GPS satellite for operational use. In alternate embodiments, all or portions of the determination of the Radial Constellation may be performed on the GPS satellite.

In various embodiments, a specific satellite may be provided with a plurality of Radial Constellations for use for various circumstances, e.g. a military situation in part of the world (war, espionage), or extreme weather or natural circumstances. The satellite may be re-configured to select and employ a different one of the provided Radial Constellations to encode and transmit the combined signal codes, depending on the need at a particular point in time.

Figure 2:
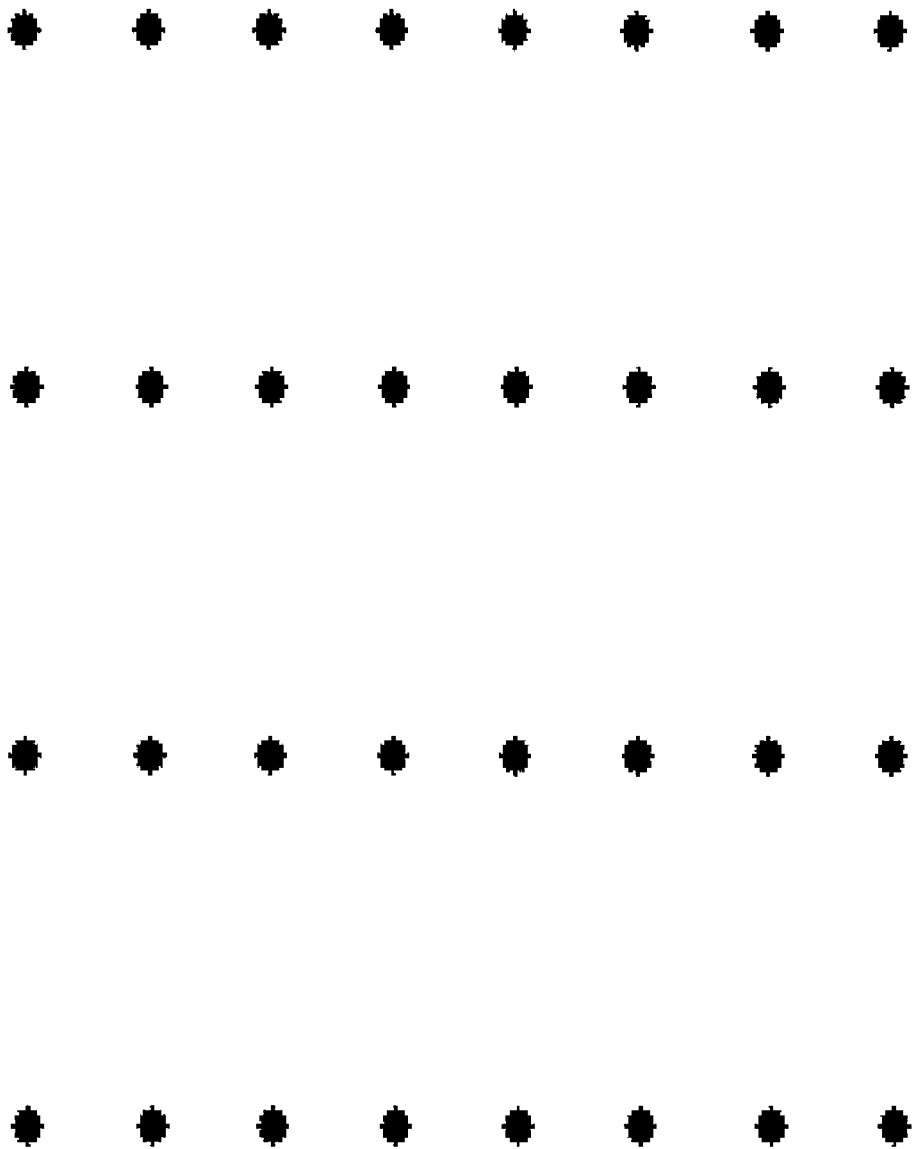
FIG. 2 depicts a GPS five signal code linear constellation, in accordance with various embodiments of the present disclosure.

FIG. 2 depicts a GPS five signal target code linear constellation, in accordance with various embodiments of the present disclosure. As illustrated, the resultant constellation for linearly combining five signal codes (three signal codes in one phase of the amplitudinal signal, and the other two in another phase of the amplitudinal signal) is an 8 by 4 symbol point rectangular matrix. The disadvantage of the linearly combined signal is that it has a high peak to average ratio; and thus the operating point of a linearly combined signal must be backed off from optimal operating point in order to achieve the same reliability level as other code combining cases. Also, because of the large amount of AM present in the signal, a linear combination signal is very susceptible to the nonlinear AM-to-AM and AM-to-PM (Phase Modulation) effects of an amplifier. Both of these factors result in less average power present at output of the amplifier.

Accordingly, the embodiments of the present disclosure use the five signal linear combination constellation as a reference to determine a five signal code Radial Constellation to combine five signal codes in a radial interplex manner, which improves on the power properties of the combined five signal codes. The Radial Constellation provides for a combined signal that may have a higher Correlatable Power Percentage, higher power efficiency, and better total correlatable power than its equivalent linear interplex of five signal target codes, with what is considered "higher" and "better" varying from embodiment to embodiment.

Figure 3:
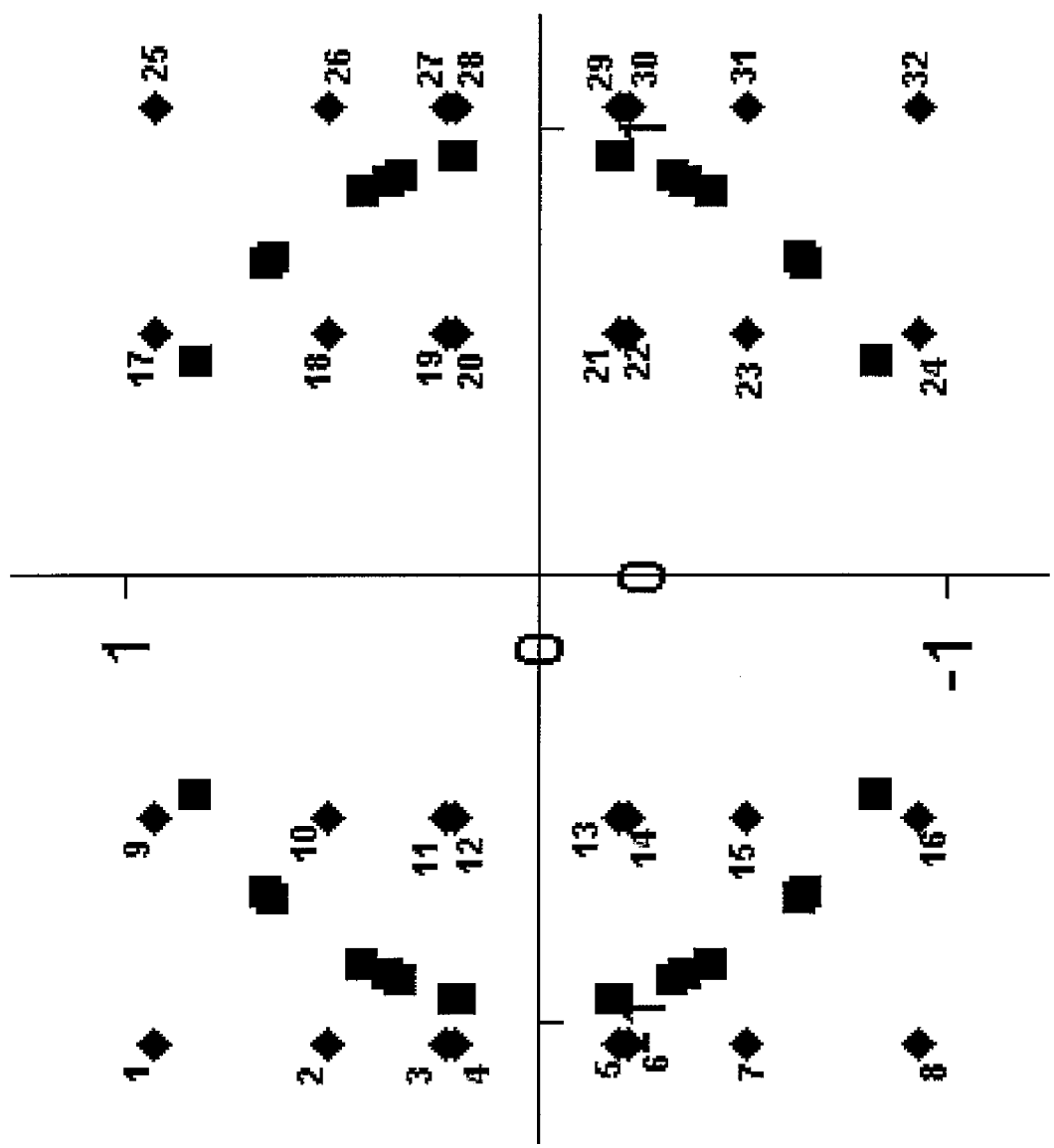
FIG. 3 depicts a GPS five signal code radial constellation, determined from the shown GPS five signal code linear constellation, in accordance with various embodiments of the present disclosure.

FIG. 3 depicts a GPS five signal code radial constellation, determined from the shown GPS five signal code linear constellation, in accordance with various embodiments of the present disclosure. The 32 numbered black diamonds of FIG. 3 depict a constant amplitude linear constellation of five signal codes that have been combined and adjusted with supplied power ratios. The 32 numbered black diamonds depict a linear constellation of a combination of five supplied signal target codes and their associated supplied power ratios. The associated constant amplitude radial constellation is depicted by the 32 black squares which form an overall circular shape centered on the origin of the cross axes, the radius of the constellation approaching 1 on the scale provided by the axes. Each one of the 32 numbered black diamonds has an equivalent black square on the circumference of the circle radius 1 by the scale shown on the axes in FIG. 3. The radius of the circle is equal to the Root Mean Square (RMS) magnitude of the constant amplitude linear constellation; this produces a constant amplitude radial constellation (the 32 black squares).

The symbol points of the linear constellation (32 black diamonds) may be modified radially with a Throw-Away; the Throw-Away may operate in both phases, both the inphase and the quadrature. This allows the symbol points of the linear constellation (32 black diamonds) to be modified in both dimensions, so as to allow the symbol points of the linear constellation (32 black diamonds) to occupy a unique position on the constant amplitude circle. The Throw-Aways added to each of the 32 symbol points of the linear constellation (32 black diamonds) may not necessarily be of equal magnitude. A Throw-Away is an additional signal that is added to the composite (combined code) signal which is not correlatable by any of the code signals. Some of the total RF power being transmitted may not useful to the GPS receiver. The Throw-Away signal is to perturb the linear constellation so that it will have the desired Amplitude Modulation (AM) properties, allowing it to run at high efficiency on a nonlinear amplifier. Using the least amount of Throw-Away power to achieve the same amount of AM, results in the maximum amount of power being transmitted by the Satellite Transmitter 103 that may be recoverable by the GPS receiver 111. In this embodiment the relationships between the symbol points of the linear constellation and the symbol points of the Radial Interplexed constellation are described by:

$$\mu_L = \frac{\left(\sum_{k=1}^{32} \sqrt{(L_k)_I^2 + (L_k)_Q^2}\right)}{32}$$

$$r_n = \sqrt{(L_n)_I^2 + (L_n)_Q^2} - d\left(\sqrt{(L_n)_I^2 + (L_n)_Q^2} - \mu_L\right)$$

$$\theta_n = \tan^{-1}((L_n)_I, (L_n)_Q)$$

$$(R_n)_I = \cos(\theta_n) r_n$$

$$(R_n)_Q = \sin(\theta_n) r_n$$

where variables are defined as, $\mu_n$=mean symbol magnitude of linear constellation
$r_n$=magnitude of symbol n in radical constellation
$\theta_n$=phase of symbol n in radical constellation
$(R_n)_I$=inphase component of symbol n in radical constellation
$(R_n)_Q$=quadphase coof symbol n in linear constellation
$(L_n)_Q$=quadphase component of symbol n in linear constellation
$(L_n)_I$=inphase component of symbol n in linear constellation
d=distortion factor, defines how much AM the resultant signal may have.

The determining of the combined five signal target code linear constellation with the supplied power ratios of FIG. 3, into a five signal Radial Interplex constellation changes the power ratios, so the supplied code power ratios of the five constituent codes may no longer be correct.

To determine a five signal target code Radial Interplex constellation with the correct code power ratios, a new modified linear constellation is derived to base the determination of the radial constellation from. Relationships may be determined between an original linear constellation with the correct power codes, and a linear constellation which resolves to a combined five signal target code Radial Interplex constellation with the correct power codes.

Figure 4:
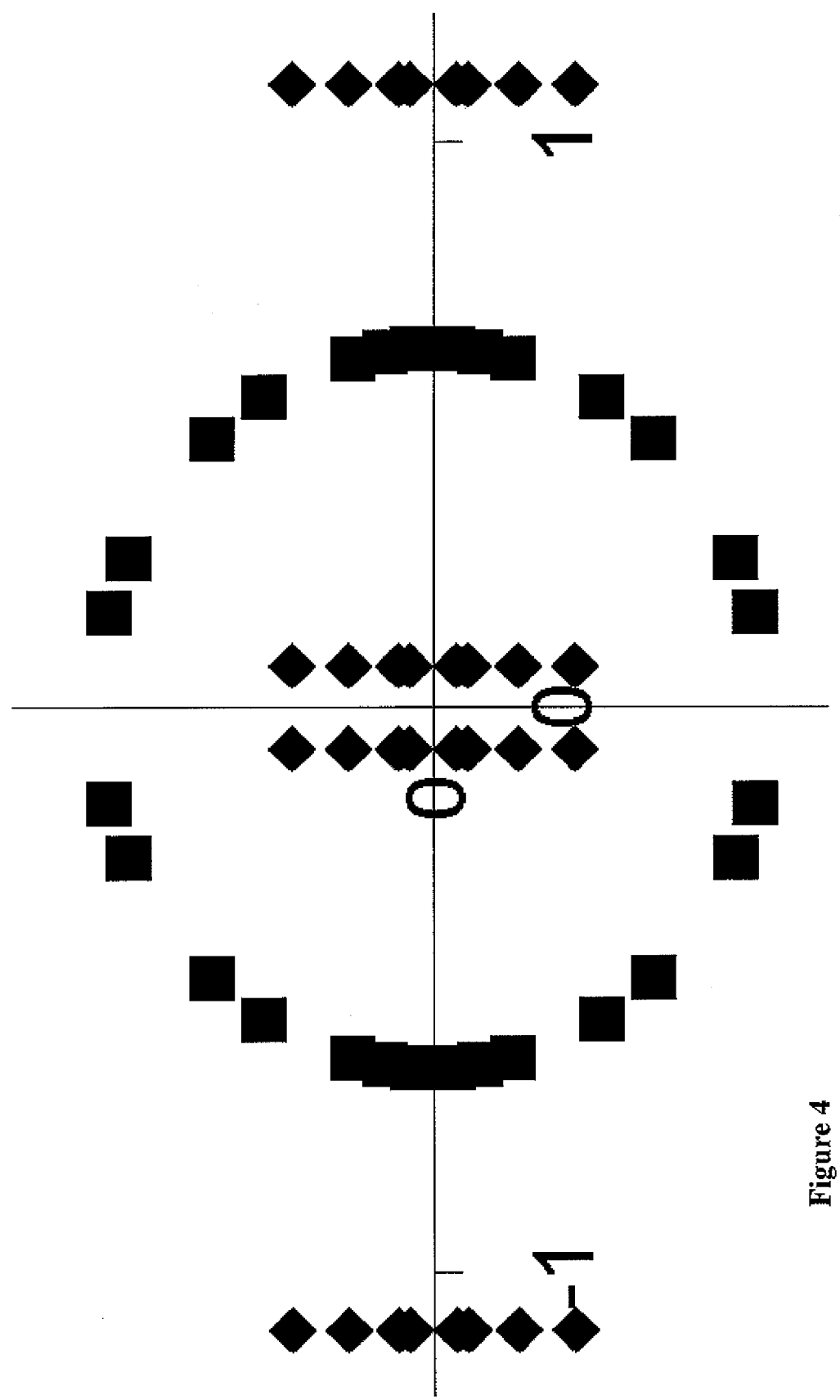
FIG. 4 depicts a GPS five signal code radial constellation with corrected power ratios determined from the shown modified GPS five signal code linear constellation, in accordance with various embodiments of the present disclosure.

The relationships between the five signal target code Radial Interplex constellation symbol points with incorrect power ratios, depicted by the 32 black squares of FIG. 3, and the five signal target code Radial Interplex constellation symbol points with correct power ratios are depicted by the 32 black squares in FIG. 4, and are described by:

$$P_{R_{C/A}} = \frac{(R_1)_I + (R_2)_I + (R_3)_I + (R_4)_I + (R_5)_I + (R_6)_I + (R_7)_I + (R_8)_I}{8} = P_{Desired_{C/A}}$$

$$P_{R_P} = \frac{(R_1)_Q + (R_2)_Q + (R_3)_Q + (R_4)_Q + (R_5)_Q + (R_6)_Q + (R_7)_Q}{8} = P_{Desired_P}$$

$$P_{R_M} = \frac{((R_1)_I + (R_2)_I + (R_3)_I + (R_4)_I) - ((R_9)_I + (R_{10})_I + (R_{11})_I + (R_{12})_I)}{8} = P_{Desired_M}$$

-continued $$P_{R_{L1CP}} = \frac{((R_1)_Q + (R_2)_Q + (R_9)_Q + (R_{10})_Q) + ((R_3)_Q + (R_4)_Q + (R_{11})_Q + (R_{12})_Q)}{8} = P_{Desired_{L1CP}}$$

$$P_{R_{L1CD}} = \frac{|(R_1)_Q - (R_2)_Q| + |(R_9)_Q - (R_{10})_Q| + |((R_3)_Q - (R_4)_Q| + |(R_{11})_Q - (R_{12})_Q|}{8} = P_{Desired_{L1CD}}$$

where the variables are defined as,
$^P R_{C/A}$=C/A power in radical constellation
$^P R_P$=P power in radical constellation
$^P R_M$=M power in radical constellation
$^P R_{LICP}$=LICP power in radical constellation
$^P R_{LICD}$=LICD power in radical constellation
$^P Desired_{C/A}$=Desired C/A power in radical constellation
$^P Desired_P$=Desired P power in radical constellation
$^P Desired_M$=Desired M power in radical constellation
$^P Desired_{LICP}$=Desired LICP power in radical constellation
$^P Desired_{LICD}$=Desired LICD power in radical constellation
$(R_n)_I$=inphase component of symbol n in radical constellation
$(R_n)_Q$=quadphase component of symbol n in radical constellation The power ratios necessary to be used when defining an original five signal linear constellation such that the five signal target code Radial Interplex constellation has the correct power ratios may be described by:

$$P_{L_{C/A}} = \frac{(L_1)_I + (L_2)_I + (L_3)_I + (L_4)_I + (L_5)_I + (L_6)_I + (L_7)_I + (L_8)_I}{8}$$

$$P_{L_P} = \frac{(L_1)_Q + (L_2)_Q + (L_3)_Q + (L_4)_Q + (L_5)_Q + (L_6)_Q + (L_7)_Q + (L_8)_Q}{8}$$

$$P_{L_M} = \frac{((L_1)_I + (L_2)_I + (L_3)_I + (L_4)_I) - ((L_9)_I + (L_{10})_I + (L_{11})_I + (L_{12})_I)}{8}$$

$$P_{L_{L1CP}} = \frac{((L_1)_Q + (L_2)_Q + (L_9)_Q + (L_{10})_Q) - ((L_3)_Q + (L_4)_Q + (L_{11})_Q + (L_{12})_Q)}{8}$$

$$P_{L_{L1CD}} = \frac{|(L_1)_Q - (L_2)_Q| + |(L_9)_Q - (L_{10})_Q| + |(L_3)_Q - (L_4)_Q| + |(L_{11})_Q - (L_{12})_Q|}{8}$$

where the variables are defined as,
$^P L_{C/A}$=C/A power in radical constellation
$^P L_P$=P power in radical constellation
$^P L_M$=M power in radical constellation
$^P L_{LICP}$=LICP power in radical constellation
$^P L_{LICD}$=LICD power in radical constellation
$(L_n)_I$=inphase component of symbol n in linear constellation
$(L_n)_Q$=quadphase component of symbol n in linear constellation In various embodiments, the Newton method, in combination with the above descriptions of:
  i) the power ratios necessary to be used when defining an original five signal target code Linear Constellation such that the five signal target code Radial Interplex constellation has the correct power ratios;
  ii) the relationship between the five signal target code Radial Interplex constellation symbol points with incorrect power ratios, and the five signal target code Radial Interplex constellation symbol points with correct power ratios; and/or
  iii) the relationship between the five signal target code linear constellation and the five signal target code Radial Interplex constellation;

may be used to determine a five signal target code Radial Interplex constellation with the correct power ratios from an original five signal target code linear constellation with the correct power ratios.

FIG. 4 depicts a GPS five signal code radial constellation with corrected power ratios (depicted by 32 black squares) determined from the shown modified GPS five signal code linear constellation (depicted by the 32 black diamonds), in accordance with various embodiments of the present disclosure.

When all of the symbol points lie on the circumference of a perfect circle the distortion factor may be considered as equal to 1. With a distortion factor of 0, the constellation may be identical to the linear constellation. With the distortion factor at 1, and the symbol points of a Radial Interplex constellation positioned on the circumference of a perfect circle with no amplitude modulation, the amplifier may transmit at maximum power. The signal being transmitted may have a low correlatable power percentage, and the amount of RF power that is usable by the GPS receiver is low. This may be improved by introducing some amplitude modulation, and using less total outward power at the amplifier. The Radial Interplex constellation may no longer be a perfect circle with the introduction of some amplitude modulation, which in turn decreases the distortion factor.

With the introduction of amplitude modulation not all points of the constellation are equal distance from the origin, this may give a cleaner signal with a higher correctable power percentage, and more usable RF power at the GPS receiver. If the power received at the GPS receiver can be satisfied with less power being output from the amplifier then more amplitude modulation may be used to generate a cleaner signal. Depending on circumstances an acceptable distortion factor may be arrived at by determining a Radial Interplex constellation with varying degrees of amplitude modulation, and using the same supplied power ratios.

Accordingly, the Radial Interplex constellation (32 black squares) depicted in FIG. 4 may be considered as showing a constellation with a distortion factor of 1. The constellation (32 black dots) in FIG. 2 may be considered as depicting a constellation with a distortion factor of 0. Thus, other radial constellations with other distortion factors may also be computed, provided to the GPS satellites, and employed for different circumstances.

Figure 5:
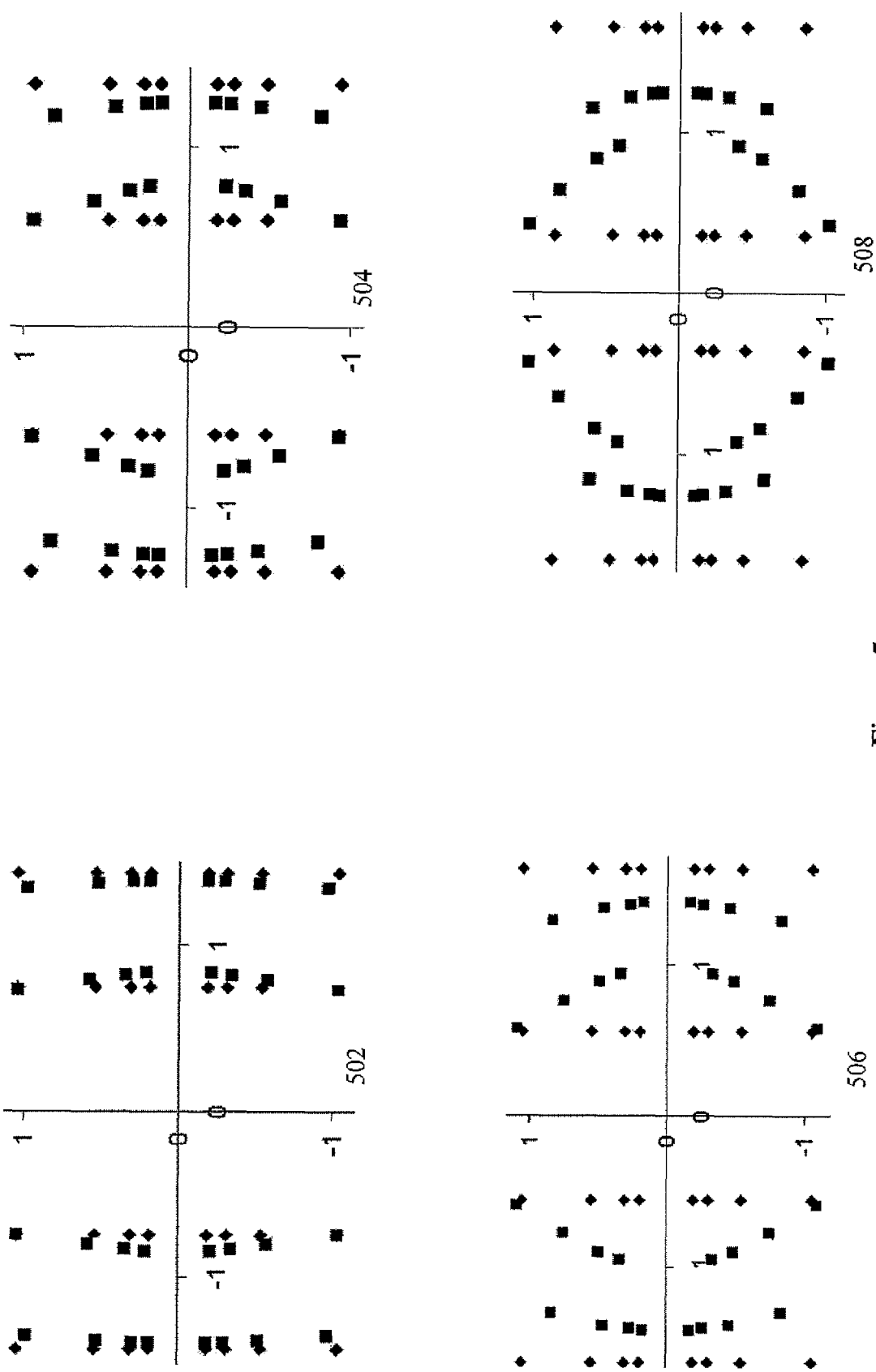
FIG. 5 depicts four GPS five signal code radial constellations, with different distortion factors, in accordance with various embodiments of the present disclosure.

FIG. 5 shows four depictions of Radial Interplex (depicted by 32 black squares) with their associated linear constellations, (depicted by 32 black diamonds) determined using different distortions factors. A radial constellation with distortion factor of 0.2 is depicted by 502, with a distortion factor of 0.04 by 504, with a distortion factor of 0.6 by 506 and a distortion factor of 0.8 by 508. The lower distortion factor equates to more amplitude modulation, a cleaner signal, and less power that may be available to be output from the amplifier.

Figure 6:
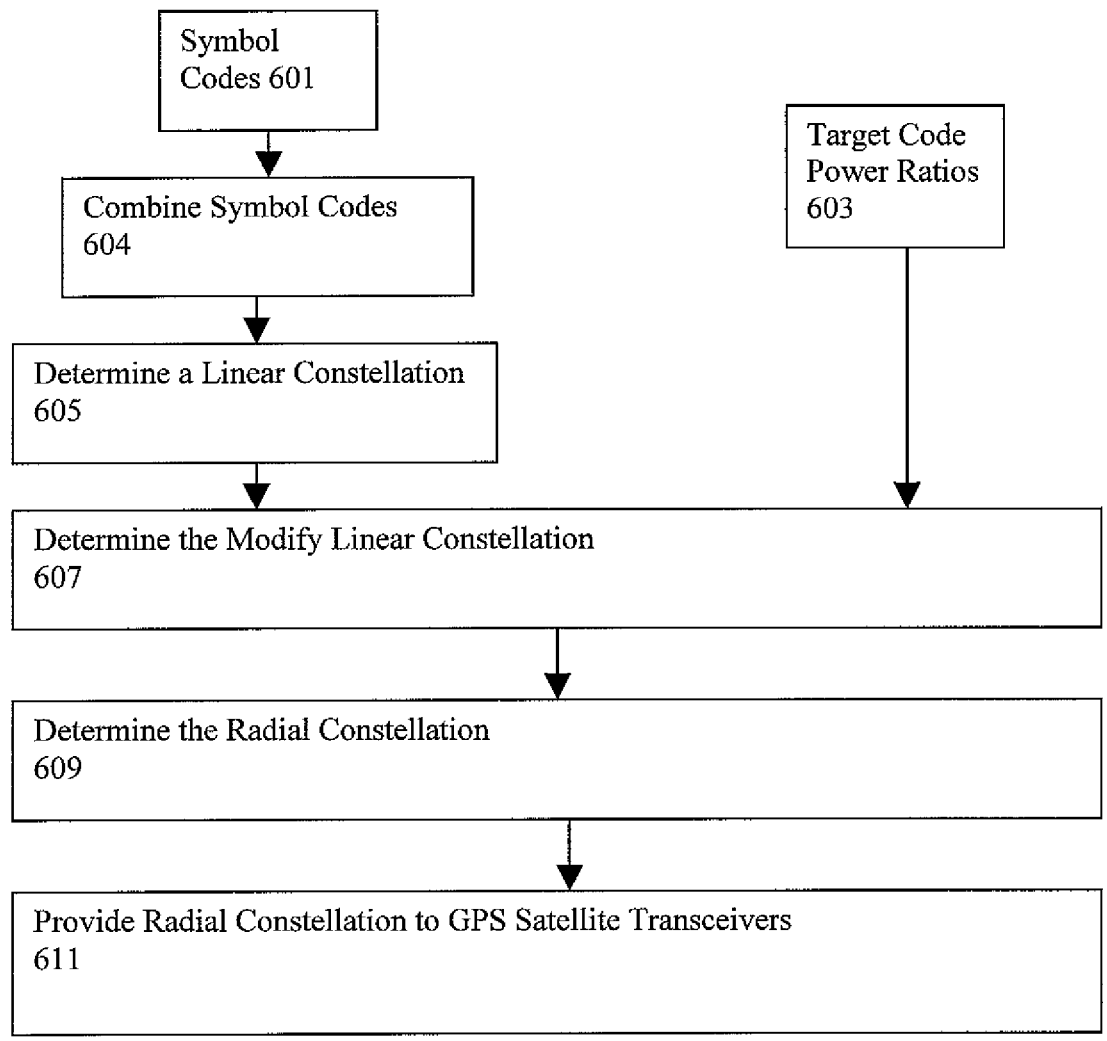
FIG. 6 depicts a flowchart view of selected operations of the methods used in accordance with various embodiments of the present disclosure.

FIG. 6 depicts a flowchart view of selected operations of the methods used in accordance with various embodiments of the disclosure. In this embodiment, the GPS navigation Signal Codes, block 601 are received by a radial constellation determination logic. In response, the radial constellation determination logic may linearly combine the Signal Codes, block 605 and determine a Linear Constellation of the linear combination, block 605.

The radial constellation determination logic may further receive supplied Target Code Power Ratios, block 603 for the supplied Symbol Codes, block 601. Using the Target Code Power Ratios, block 603 the radial constellation determination logic may determine The Modified Linear Constellation for deriving the Radial Constellation for the supplied Target Code Power Ratios, block 607. The determination and derivation may be performed by solving the earlier described systems of linear equations. Using the determined modified linear constellation the radial constellation determination logic may determine The Radial Constellation for radial interplex combined signal codes for the given Target Code Power Ratios, block 609.

On determination, the Radial Constellation may be provided to a GPS satellite for operational use, block 611.

Figure 7:
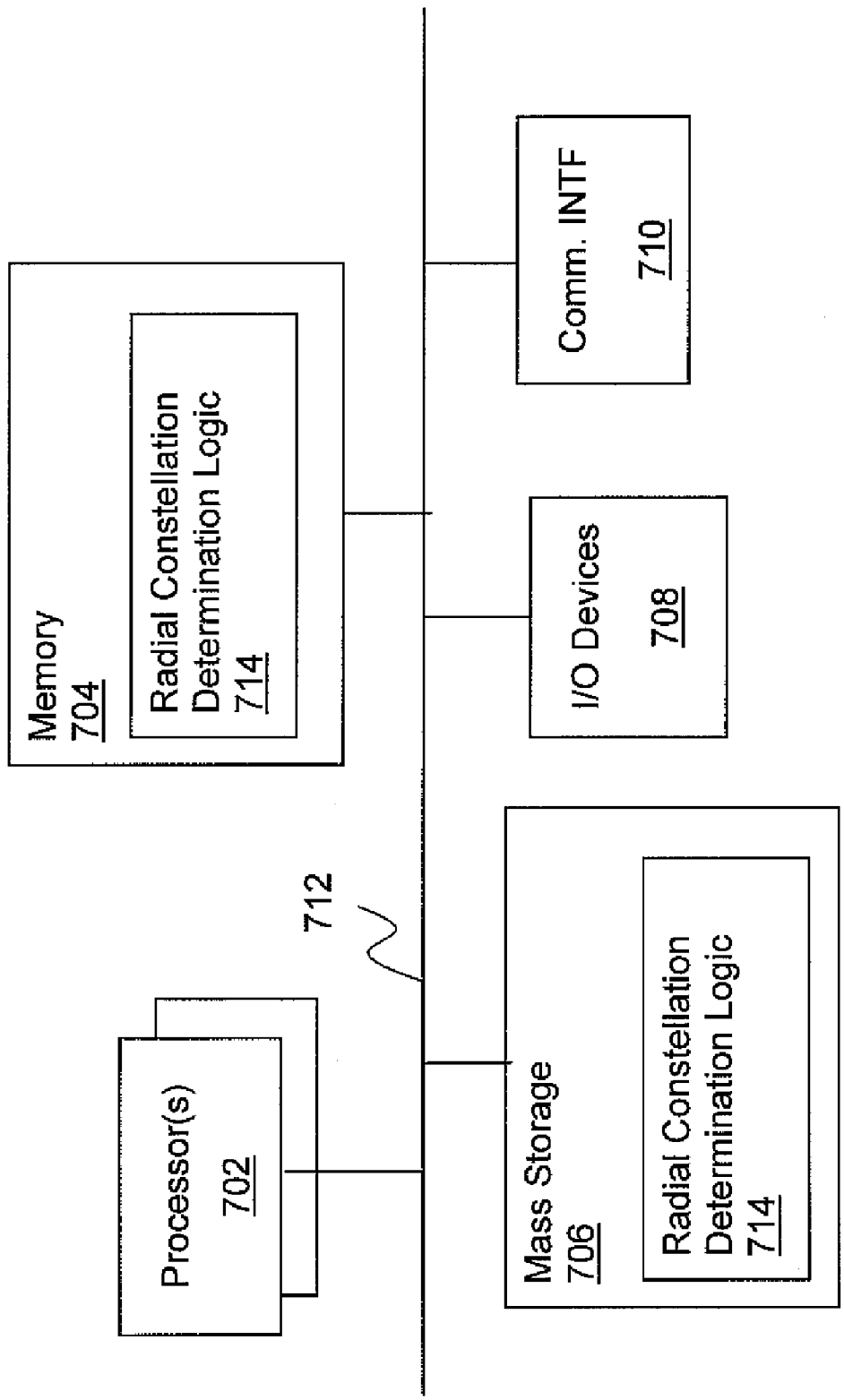
FIG. 7 depicts an exemplary computing device capable of performing the operations of various embodiments of the present disclosure.

FIG. 7 depicts an example of a computing device capable of performing all or part of the operations of various embodiments of the present disclosure. As shown, computing system/device 700 may include one or more processors 702, and system memory 704. Additionally, computing system/device 700 may include one or more selectively removable data storage devices 706 (such as diskette, hard drive, CDROM, solid-state memory, thumb drive, and so forth), input/output devices 708 (such as keyboard, cursor control and so forth) and communication interfaces 710 (such as network interface cards, modems and so forth). The communication interfaces 710 may include a transmitter (not shown) (optionally augmented by driver software) which is capable of transmitting a GPS navigational signal via a communication fabric. The elements may be coupled to each other via system bus 712, which represents one or more buses. In the case of multiple buses, they may be bridged by one or more bus bridges (not shown).

System memory 704 and mass storage 706 may be employed to store a working copy and a permanent copy of the programming instructions implementing one or more aspects of the above described teachings for determining the radial constellation for radial interplex combined signal codes for a set of target code power ratios, such as radial constellation determination logic 714. The programming instructions may be implemented in assembler instructions supported by processor(s) 702, interpreted scripts/code, or high level languages, such as C, that may be compiled into such instructions. The permanent copy of the programming instructions may be placed into permanent storage 706 in the factory, or in the field, through, e.g., a distribution medium (not shown) or through communication interface 710 (from a distribution server (not shown)).

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof.

What is claimed:

1. A signaling method comprising:
   receiving by a computing device a plurality of target code power ratios for a signaling system to transmit a plurality of codes via a combined signal combining a plurality of signals correspondingly having the codes; and
   determining by the computing device a radial constellation having a plurality of symbol points substantially meeting the target code power ratios, the radial constellation of symbol points having a radially movement relationship with symbol points of an adjusted linear constellation derived from symbol points of a linear constellation corresponding to linearly combining the signals having the codes.

2. The method of claim 1, further comprising the computing device informing the signaling system of the determined symbol points of the radial constellation.

3. The method of claim 1, wherein the radial constellation has a radius equals to a root mean square of amplitudes of the symbol points of the linear constellation.

4. The method of claim 1, wherein the radial constellation has a radius less than a root mean square of amplitudes of the symbol points of the linear signaling constellation.

5. The method of claim 1, wherein the plurality of codes and signals comprise five codes and five signals respectively, and said determining comprise solving for code power ratios for a quadrant of symbol points of the linear constellation by solving:

$$P_{R_{C/A}} = \frac{(R_1)_I + (R_2)_I + (R_3)_I + (R_4)_I + (R_5)_I + (R_6)_I + (R_7)_I + (R_8)_I}{8} = P_{Desired_{C/A}}$$

$$P_{R_P} = \frac{(R_1)_Q + (R_2)_Q + (R_3)_Q + (R_4)_Q + (R_5)_Q + (R_6)_Q + (R_7)_Q + (R_8)_I}{8} = P_{Desired_P}$$

$$P_{R_M} = \frac{((R_1)_I + (R_2)_I + (R_3)_I + (R_4)_I) - ((R_9)_I + (R_{10})_I + (R_{11})_I + (R_{12}))_I}{8} = P_{Desired_M}$$

$$P_{R_{L1CP}} = \frac{((R_1)_Q + (R_2)_Q + (R_9)_Q + (R_{10})_Q) + ((R_3)_Q + (R_4)_Q + (R_{11})_Q + (R_{12})_Q)}{8} = P_{Desired_{L1CP}}$$

$$P_{R_{L1CD}} = \frac{|(R_1)_Q - (R_2)_Q| + |(R_9)_Q - (R_{10})_Q| + |((R_3)_Q - (R_4)_Q| + |(R_{11})_Q - (R_{12})_Q)|}{8} = P_{Desired_{L1CD}}$$

where the variables are defined as,
$P_{R_{C/A}}$ = C/A power in radical constellation
$P_{R_P}$ = P power in radical constellation
$P_{R_M}$ = M power in radical constellation
$P_{R_{L1CP}}$ = L1CP power in radical constellation
$P_{R_{L1CD}}$ = L1CD power in radical constellation
$P_{Desired_{C/A}}$ = Desired C/A power in radical constellation
$P_{Desired_P}$ = Desired P power in radical constellation
$P_{Desired_M}$ = Desired M power in radical constellation
$P_{Desired_{L1CP}}$ = Desired L1CP power in radical constellation
$P_{Desired_{L1CD}}$ = Desired L1CD power in radical constellation
$(R_n)_I$ = inphase component of symbol n in radical constellation
$(R_n)_Q$ = quadphase component of symbol n in radical constellation.

6. The method of claim 5, wherein each power code level is described as follows:

$$P_{L_{C/A}} = \frac{(L_1)_I + (L_2)_I + (L_3)_I + (L_4)_I + (L_5)_I + (L_6)_I + (L_7)_I + (L_8)_I}{8}$$

-continued $$P_{L_P} = \frac{(L_1)_Q + (L_2)_Q + (L_3)_Q + (L_4)_Q + (L_5)_Q + (L_6)_Q + (L_7)_Q + (L_8)_Q}{8}$$

$$P_{L_M} = \frac{((L_1)_I + (L_2)_I + (L_3)_I + (L_4)_I) - ((L_9)_I + (L_{10})_I + (L_{11})_I + (L_{12})_I)}{8}$$

$$P_{L_{LICP}} = \frac{((L_1)_Q + (L_2)_Q + (L_9)_Q + (L_{10})_Q) - ((L_3)_Q + (L_4)_Q + (L_{11})_Q + (L_{12})_Q)}{8}$$

$$P_{L_{LICD}} = \frac{|(L_1)_Q - (L_2)_Q| + |(L_9)_Q - (L_{10})_Q| + |(L_3)_Q - (L_4)_Q| + |(L_{11})_Q - (L_{12})_Q|}{8}$$

where the variables are defined as,
$P_{L_{C/A}}$=C/A power in radical constellation
$P_{L_P}$=P power in radical constellation
$P_{L_M}$=M power in radical constellation
$P_{L_{LICP}}$=LICP power in radical constellation
$P_{L_{LICD}}$=LICD power in radical constellation
$(L_n)_I$=inphase component of symbol n in linear constellation
$(L_n)_Q$=quadphase component of symbol n in linear constellation.

7. The method of claim 1, wherein said determining comprises relating the symbol points of the linear and radial constellations as follows:

$$\mu_L = \frac{\left(\sum_{k=1}^{32} \sqrt{(L_k)_I^2 + (L_k)_Q^2}\right)}{32}$$

$$r_n = \sqrt{(L_n)_I^2 + (L_n)_Q^2} - d\left(\sqrt{(L_n)_I^2 + (L_n)_Q^2} - \mu_L\right)$$

$$\theta_n = \tan^{-1}((L_n)_I, (L_n)_Q)$$

$$(R_n)_I = \cos(\theta_n) r_n$$

$$(R_n)_Q = \sin(\theta_n) r_n$$

where variables are defined as,
$\mu_n$=mean symbol magnitude of linear constellation
$r_n$=magnitude of symbol n in radical constellation
$\theta_n$=phase of symbol n in radical constellation
$(R_n)_I$=inphase component of symbol n in radical constellation
$(R_n)_Q$=quadphase coof symbol n in linear constellation
$(L_n)_Q$=quadphase component of symbol n in linear constellation
$(L_n)_I$=inphase component of symbol n in linear constellation
d=distortion factor, defines how much AM the resultant signal may have.

8. A signaling system comprising:
one or more signal generators generating a plurality of signals having a plurality of codes;
a storage having stored therein a data structure of a plurality of symbol points of a radial constellation substantially meeting a plurality of target code power ratios, the radial constellation of symbol points having a radially movement relationship with symbol points of an adjusted linear constellation derived from symbol points of a linear constellation corresponding to linearly combining the signals having the codes;
a signal combiner coupled to the one or more signal generators and the storage to combine the plurality of signals into a combined signal; and
a transmitter coupled to the signal combiner to transmit the combine signal.

9. The signaling system of claim 8, wherein the signaling system is a global positioning system.

10. The signaling system of claim 9, wherein the plurality of codes and signals comprise five codes and five signals respectively, and each of the linear and radial constellations has 32 symbol points.

11. An apparatus comprising:
a receiver to receive a combined signal combining a plurality of signals of a plurality of codes, the combined signal being transmitted using symbol points of a radial constellation, the radial constellation of symbol points having a radially movement relationship with symbol points of an adjusted linear constellation derived from symbol points of a linear constellation corresponding to linearly combining the signals having the codes;
a storage having stored therein a data structure of the symbol points of the radial constellation substantially meeting a plurality of target code power ratios; and
a signal recoverer coupled to the receiver and the storage to recover and output the signals having the codes.

12. The apparatus of claim 11, wherein the codes are global positioning codes.

13. The signaling system of claim 12, wherein the plurality of codes and signals comprise five codes and five signals respectively, and each of the linear and radial constellations has 32 symbol points.

14. An article of manufacture comprising:
a computer readable medium having stored therein a plurality of programming instructions for programming an apparatus to enable the apparatus to determine a radial constellation having a plurality of symbol points substantially meeting a plurality of target code power ratios, the radial constellation of symbol points having a radially movement relationship with symbol points of an adjusted linear constellation derived from symbol points of a linear constellation corresponding to linearly combining a plurality of signals having a plurality of codes, the apparatus comprising:
a storage having stored therein the symbol points of the radial constellation; and
a signal combiner coupled to the storage to combine the plurality of signals into a combined signal.

15. The article of claim 14, wherein the programming instructions further enable the apparatus to receive the target code power ratios.

16. The article of claim 14 the programming instructions further enable the apparatus to inform the signaling system of the determined symbol points of the radial constellation.

17. The article of claim 14, wherein the radial constellation has a radius equals to a root mean square of amplitudes of the symbol points of the linear constellation.

18. The article of claim 14, wherein the radial constellation has a radius less than a root mean square of amplitudes of the symbol points of the linear signaling constellation.

19. The article of claim 14, wherein the plurality of codes are global positioning codes, the plurality of codes and signals comprise five codes and five signals respectively, and said determining comprise solving for code power ratios for a quadrant of symbol points of the linear constellation by solving:

$$P_{R_{C/A}} = \frac{\begin{array}{c}(R_1)_I + (R_2)_I + (R_3)_I + (R_4)_I + \\ (R_5)_I + (R_6)_I + (R_7)_I + (R_8)\end{array}}{8} = P_{Desired_{C/A}}$$

$$P_{R_P} = \frac{\begin{array}{c}(R_1)_Q + (R_2)_Q + (R_3)_Q + (R_4)_Q + \\ (R_5)_Q + (R_6)_Q + (R_7)_Q + (R_8)_I\end{array}}{8} = P_{Desired_P}$$

$$P_{R_M} = \frac{\begin{array}{c}((R_1)_I + (R_2)_I + (R_3)_I + (R_4)_I) - \\ ((R_9)_I + (R_{10})_I + (R_{11})_I + (R_{12}))_I\end{array}}{8} = P_{Desired_M}$$

$$P_{R_{L1CP}} = \frac{\begin{array}{c}((R_1)_Q + (R_2)_Q + (R_9)_Q + (R_{10})_Q) + \\ ((R_3)_Q + (R_4)_Q + (R_{11})_Q + (R_{12})_Q)\end{array}}{8} = P_{Desired_{L1CP}}$$

$$P_{R_{L1CD}} = \frac{\begin{array}{c}|(R_1)_Q - (R_2)_Q| + |(R_9)_Q - (R_{10})_Q| + \\ |((R_3)_Q - (R_4)_Q| + |(R_{11})_Q - (R_{12})_Q|\end{array}}{8} = P_{Desired_{L1CD}}$$

where the variables are defined as, $^P R_{C/A}$=C/A power in radical constellation
$^P R_P$=P power in radical constellation
$^P R_M$=M power in radical constellation
$^P R_{LICP}$=LICP power in radical constellation
$^P R_{LICD}$=LICD power in radical constellation
$^P Desired_{C/A}$=Desired C/A power in radical constellation
$^P Desired_P$=Desired P power in radical constellation
$^P Desired_M$=Desired M power in radical constellation
$^P Desired_{LICP}$=Desired LICP power in radical constellation
$^P Desired_{LICD}$=Desired LICD power in radical constellation
$(R_n)_I$=inphase component of symbol n in radical constellation
$(R_n)_Q$=quadphase component of symbol n in radical constellation.

* * * * *